United States Patent
Gray et al.

(10) Patent No.: US 10,777,004 B2
(45) Date of Patent: *Sep. 15, 2020

(54) SYSTEM AND METHOD FOR GENERATING THREE-DIMENSIONAL ROBOTIC INSPECTION PLAN

(71) Applicant: General Electric Company, Schenectady, NY (US)

(72) Inventors: Steven Gray, Niskayuna, NY (US); Shiraj Sen, Niskayuna, NY (US); Ghulam Ali Baloch, Niskayuna, NY (US); Mauricio Castillo-Effen, Niskayuna, NY (US); Charles Theurer, Alpiaus, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,212

(22) Filed: Nov. 14, 2019

(65) Prior Publication Data

US 2020/0082623 A1 Mar. 12, 2020

Related U.S. Application Data

(63) Continuation of application No. 15/585,502, filed on May 3, 2017, now Pat. No. 10,521,960.

(51) Int. Cl.
*G06T 15/00* (2011.01)
*G06T 19/00* (2011.01)
(Continued)

(52) U.S. Cl.
CPC ......... *G06T 19/003* (2013.01); *G05D 1/0094* (2013.01); *G08G 5/006* (2013.01);
(Continued)

(58) Field of Classification Search
CPC .... G05D 1/0044; G06T 19/003; G06T 19/006
See application file for complete search history.

(56) References Cited

U.S. PATENT DOCUMENTS 8,352,072 B2 1/2013 Gal et al.
9,104,202 B2 8/2015 Pack et al.
(Continued)

FOREIGN PATENT DOCUMENTS

EP 1842631 B1 11/2008
EP 2952993 A1 9/2015
(Continued)

OTHER PUBLICATIONS

Gramegna, Tommaso, et al.; "Automatic Construction of 2D and 3D Models During Robot Inspection", Industrial Robot: An International Journal, 2006, 9 pp.
(Continued)

*Primary Examiner* — Charles Tseng
(74) *Attorney, Agent, or Firm* — Fletcher Yoder, P.C.

(57) ABSTRACT

Provided are systems and methods for generating an autonomous 3D inspection plan for an unmanned robot. In an example, the method may include receiving a selection of a plurality of regions of interest with respect to a virtual asset displayed in virtual space, detecting a 3D position of the regions of interest within a coordinate frame of the virtual space, auto-generating a travel path about a physical asset corresponding to the virtual asset by generating a virtual 3D travel path with respect to the virtual asset based on the detected 3D positions of the selected regions of interest within the coordinate frame, aligning the virtual 3D travel path in the virtual space with a physical travel path in a physical space, and outputting a robotic inspection plan comprising the auto-generated physical travel path for the unmanned robot.

20 Claims, 7 Drawing Sheets

(51) Int. Cl.
   *G08G 5/00*   (2006.01)
   *G05D 1/00*   (2006.01)
(52) U.S. Cl.
   CPC ......... *G08G 5/0013* (2013.01); *G08G 5/0034* (2013.01); *G08G 5/0069* (2013.01); *Y10S 901/01* (2013.01)

(56) References Cited

U.S. PATENT DOCUMENTS

| | | |
|---|---|---|
| 9,463,574 B2 | 10/2016 | Purkayastha et al. |
| 9,613,538 B1 | 4/2017 | Poole et al. |
| 2010/0073363 A1 | 3/2010 | Densham et al. |
| 2010/0077311 A1 | 3/2010 | Santoro et al. |
| 2010/0286859 A1 | 11/2010 | Feigh et al. |
| 2012/0072052 A1 | 3/2012 | Powers et al. |
| 2014/0018979 A1 | 1/2014 | Goossen et al. |
| 2014/0316636 A1 | 10/2014 | Hong et al. |
| 2014/0336928 A1 | 11/2014 | Scott |
| 2015/0025788 A1 | 1/2015 | Crain et al. |
| 2017/0039764 A1 | 2/2017 | Hu et al. |
| 2017/0039859 A1 | 2/2017 | Hu et al. |

FOREIGN PATENT DOCUMENTS

| | | |
|---|---|---|
| WO | 2016149513 A1 | 9/2016 |
| WO | 2016203151 A1 | 12/2016 |
| WO | 2017027939 A1 | 2/2017 |

OTHER PUBLICATIONS

Oh, Je-Keun, et al.; "Design and Control of Bridge Inspection Robot System", Proceedings of the 2007 IEEE International Conference on Mechatronics and Automation, Aug. 5-8, 2007, Harbin, China, 6 pp.

International Search Report and Written Opinion issued in connection with PCT/US2018/28819 dated Aug. 2, 2018.

SYSTEM AND METHOD FOR GENERATING THREE-DIMENSIONAL ROBOTIC INSPECTION PLAN

CROSS-REFERENCE TO RELATED APPLICATIONS

This application is a continuation of U.S. patent application Ser. No. 15/585,502, entitled "SYSTEM AND METHOD FOR GENERATING THREE-DIMENSIONAL ROBOTIC INSPECTION PLAN," filed May 3, 2017, which is incorporated by reference herein in its entirety for all purposes.

BACKGROUND

Machine and equipment assets, generally, are engineered to perform particular tasks as part of a business process. Assets are used and maintained for a variety of purposes including energy, transportation, healthcare, manufacturing, and the like. For example, assets may include distributed assets, such as a pipeline, a bridge, an electrical grid, or the like, as well as individual or discrete assets, such as a tower, a locomotive, a wind turbine, a gas flare, drilling/mining equipment, and the like. The design and implementation of these assets often takes into account both the physics of the task at hand, as well as the environment in which such assets are configured to operate.

Despite being well constructed of such materials as steel, concrete, brick, and the like, assets often deteriorate over time due to exposure to environmental conditions and other factors. Assets may experience various types of defects including spontaneous mechanical defects, electrical defects, as well as routine wear-and-tear. These defects can severely impact the operation and performance of the asset. For example, an asset may undergo corrosion or experience cracking due to weather and temperature or the asset may exhibit deteriorating performance or efficiency due to the wear or failure of certain component parts. If the damage to the asset is not repaired in a timely manner, it can lead to more serious problems and even cause the asset to break down completely.

Typically, a human inspector such as an expert or a technician of a particular type of asset may inspect, maintain, repair, and request repairs to an asset. For example, the inspector may locate corrosion on the asset and clean the corrosion therefrom, identify a part of the asset that needs replacement and order and install the replacement part, and the like. However, depending on a location of the asset, a size of the asset, and/or a complexity of the asset, human inspection of the asset can be difficult and dangerous. For example, it is difficult for a person to inspect the blades of an operating wind turbine, the tower of a gas flare, or the like, without risking potential injury. In addition, assets can be located in harsh environments such as at sea, in deserted areas, near high temperature systems (e.g., oil and gas), inside mines or tanks, and the like. Therefore, improved systems and techniques for monitoring the health of assets are needed.

SUMMARY

Embodiments described herein improve upon the prior art by providing systems and methods for generating a virtual inspection plan of an asset for an unmanned robot. The unmanned robot can travel to the asset and monitor the health of the asset by capturing image data, and the like, based on the virtual inspection plan. In various embodiments, the unmanned robot can move autonomously in both lateral and vertical directions with respect to the asset based on a virtual 3D travel path included within the virtual inspection plan. The virtual 3D travel path may be generated with respect to a digital replica (e.g., virtual asset) that corresponds to a physical asset that is to be monitored. In addition to the 3D travel path, the virtual inspection plan can include a plurality of regions of interest as well as multiple details about inspecting the regions of interest. Such embodiments provide an improved ability to inspect an asset by generating 3D models in virtual space based on a virtual asset which can be used to control 3D movement of the unmanned robot about a physical asset in physical space to perform highly accurate inspections without user control.

In an aspect of an example embodiment, provided is a computing system including a storage configured to store a plurality of regions of interest with respect to a virtual asset displayed in virtual space and selected via a user interface, and store a 3D position of each selected region of interest within a coordinate frame of the virtual space, a processor configured to generate a travel path for the unmanned robot about a physical asset corresponding to the virtual asset, wherein the generating includes generating a virtual 3D travel path with respect to the virtual asset based on the detected 3D positions of the selected regions of interest within the coordinate frame and aligning the virtual 3D travel path in the virtual space with a physical travel path in a physical space, and an output configured to output a robotic inspection plan comprising the generated physical travel path about the physical asset for the unmanned robot.

In an aspect of another example embodiment, provided is a method for generating a virtual inspection plan that is to be performed by an unmanned robot, the method including receiving, via a user interface, a selection of a plurality of regions of interest with respect to a virtual asset displayed in virtual space, detecting a 3D position of each selected region of interest within a coordinate frame of the virtual space, generating a travel path for the unmanned robot about a physical asset corresponding to the virtual asset, the generating comprising generating a virtual 3D travel path with respect to the virtual asset based on the detected 3D positions of the selected regions of interest within the coordinate frame, and aligning the virtual 3D travel path in the virtual space with a physical travel path in a physical space, and outputting a robotic inspection plan comprising the generated physical travel path about the physical asset for the unmanned robot.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings which are briefly described as follows.

Figure 1:
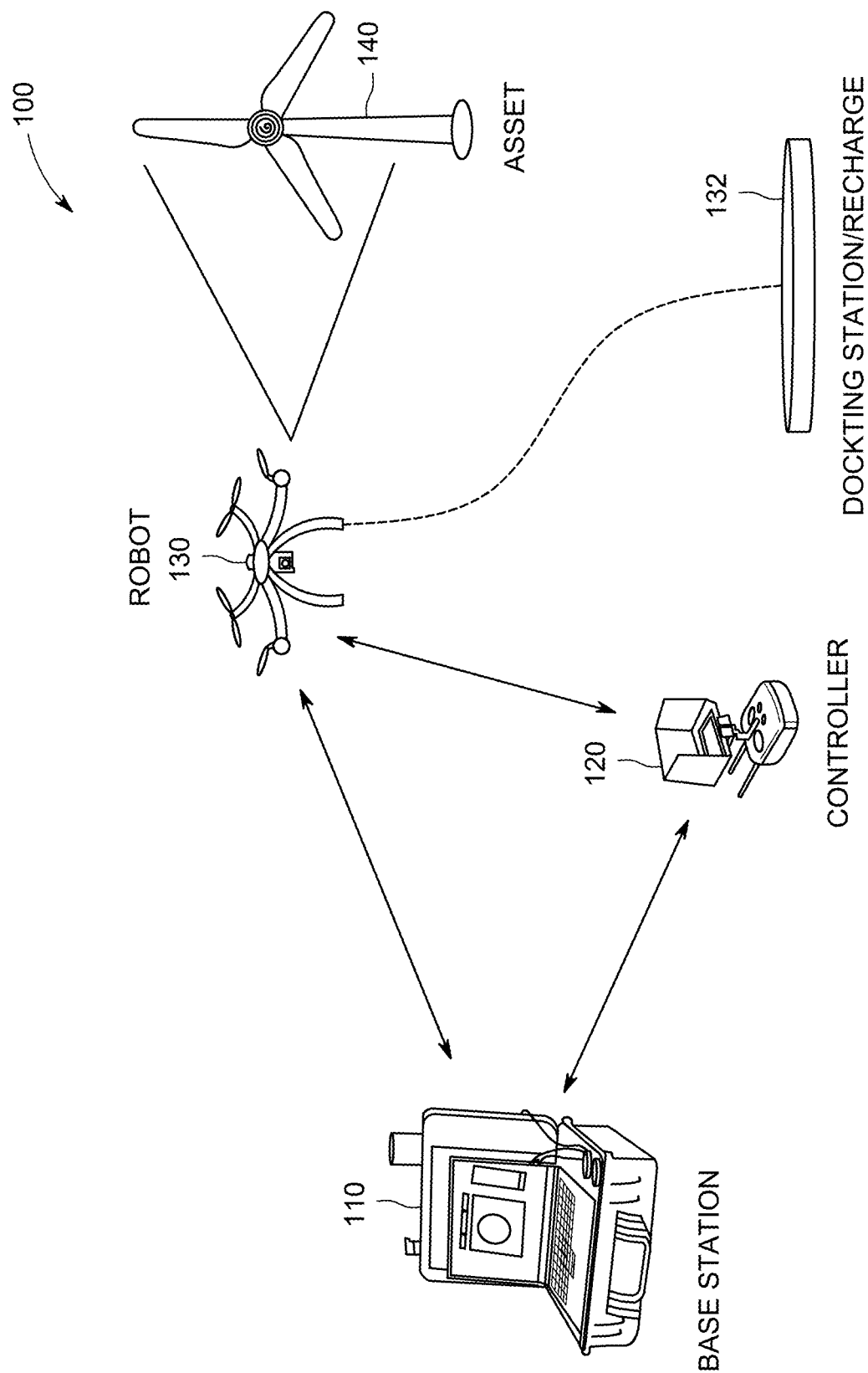
FIG. 1 is a diagram illustrating a robotic inspection system in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Drones and other unmanned robots have been increasingly used for different industrial tasks. One such task is the inspection of industrial assets, and in particular, inspection of assets that pose some kind of safety hazards for maintenance crew. Robots can reach difficult-to-access locations on or about an asset, including regions on a flare stack, a wind turbine, power lines, a power tower, within tanks, on platforms at sea, and the like. An inspection is typically performed by taking close-up pictures and videos of areas of the asset, and by collecting environmental data that can be used to detect symptoms, diagnose problems, and plan corrective maintenance procedures.

Related inspection methods with robots such as drones requires at least two people, a pilot and an inspector. The pilot operates the drone while it is near the asset and stops at certain points of interest. The inspector remotely controls the drone camera gimbal, shutter and other sensors, collecting data and taking high-resolution photos and measurements of these points of interest. The inspector also monitors a live camera view to ensure that the camera gimbal is properly aimed, pictures are correctly taken and exposed, and the sensor data is within acceptable ranges. This is important to assure the quality of data collected and, as a consequence, the overall quality of the inspection. However, due to communication bandwidth and on-board drone hardware limitations, the quality of the data can only be fully assessed after the drone lands.

Typically, when the drone is docked, the inspector downloads the photos from the drone (usually via SD card or cable) and goes over the photos in a manual process. If important shots are unclear, improperly centered, or even missing, the measurements have to be re-taken, requiring the drone to be flown again to cover a subset of the points of interests. At the end of the inspection, all photos and sensor data are saved in a computer and brought back to an inspection station where a final inspection report is produced, with the detected problems described and with the picture evidence. This report may also be saved as a maintenance record and a future reference of asset condition.

These related inspection processes are often ad-hoc, with limited planning before visiting a site and flying the drone. Inspectors use their judgment and experience to guide the pilot through different points of interest on or around the asset based on current conditions. In some cases, the drone may even take one or two preliminary flights to determine a location of the asset and its parts. It might take several iterations of drone flights and photos to be taken until the photos are deemed satisfactory (i.e., clearly show the points of interests and are correctly exposed) and the location of the asset is fully understood. This is a time-consuming process, depending on the number of points of interests, weather condition and the manual skills of both pilot and inspector. This inefficiency also incurs more cost in terms of labor and resources.

The example embodiments provide an application that includes a user interface for generating a virtual three-dimensional (3D) robotic travel path for inspecting an asset. Through the user interface, a user may generate a 3D inspection plan for an industrial asset. A virtual model of an asset (e.g., a digital twin of a real asset) may be imported into the system and displayed via the user interface. One or more regions of interest on the asset may be selected via the user interface. Based on the selected points of interest, the application may automatically generate a 3D travel path for an inspection robot about the virtual asset, define a back-off distance of the inspection robot, define a minimal resolvable features that need to be detected at each inspection point, and define a viewing angle of one or more sensors on the inspection robot. Based on the information provided through the user interface, the system may align the virtual 3D travel path with a physical asset in physical space and plan a physical travel path and inspection plan for an autonomous robotic vehicle to follow and collect data and metadata of the physical asset.

According to various embodiments, the inspection robot may be part of a robotic system for monitoring the health of an asset. The autonomous inspection robot (e.g., an aircraft, a crawling robot, a walking robot, a submersible, etc.) may have imaging and/or sensing capabilities and may generate autonomous or semi-autonomous movement that may be used to inspect an asset. For example, the robot may be an unmanned aircraft vehicle (UAV) such as a drone, or other type of robot (e.g., crawler, roller, walker, autonomous underwater vehicle (AUV), etc.) The operation of the robot may have varying degrees of autonomy, between semi-autonomous and fully autonomous based on onboard computers and software. In order to adequately monitor the asset, the robot may move autonomously and without user control in lateral, longitudinal, and vertical directions based on a virtually created three-dimensional (3D) travel path included in a virtual inspection plan. In addition, based on the virtual 3D travel path, a processor of the robot may align the virtual 3D travel path with the real world and control movement of the robot three-dimensionally.

As a non-limiting example, in a semi-autonomous situation, a user may control the flight or movement of the robot while the robot autonomously controls a sensor attached to the robot to change orientation and field of view while capturing data/images based on the flight inspection plan that includes the 3D travel path. In another example, the movement of the robot may be completely autonomous. In this situation, no human interaction is necessary and the unmanned vehicle can take off from its base, fly, walk, roll, or swim, on its planned path, and return safely back to base on a predetermined schedule.

An inspection plan (e.g., flight inspection plan) including the virtual 3D travel path of and/or about an asset may be provided to the robot (or a computer system thereof) via a data link. The robot may travel to a location of the asset in the real world and align the virtually created 3D model of the travel path with a real travel path based on global positioning system (GPS) coordinates or differential global positioning system (DGPS) coordinates of the asset in comparison to GPS/DGPS coordinates of the robot. Once the robot has arrived at a desired start location, the robot may move along the real travel path from the start location to an end location in an autonomous or semi-autonomous fashion based on the virtual 3D travel path included in the inspection plan. The start and stop locations of the travel path may be dynamically selected by a user when generating the virtual 3D travel path. Accordingly, only specific areas of interest about the asset can be monitored and evaluated dynamically instead of requiring a drone or another robot to monitor the asset from top to bottom.

While executing the travel path, the robot may stop, pause, slow down, speed-up, maintain speed, etc., and capture images as well as sense for other data (e.g., temperature, humidity, pressure, etc.) at various regions of interest (ROI) designated by the inspection plan. For each ROI, the virtual 3D model of the travel path may also include three-dimensional coordinates (e.g., X, Y, and Z axis coordinates) at which the robot is to be located for performing inspection. In addition to a location in three dimensional space, each ROI may include an angle with respect to a surface of the asset at which the robot should capture data images, and the like.

The robotic system may be used to monitor, repair and maintain an asset. As discussed herein, assets may be generally discrete or limited in their extent (e.g., a transportation vehicle such as an aircraft, locomotive, subway, helicopter, ship, submersible, space launch vehicle, satellite, and so forth) or may be geographically distributed (e.g., a road or rail track, a port or airport, a pipeline, electrical infrastructure, a power generation facility, manufacturing plant, wind farm, bridge, platform, and so forth). The present approach as described herein may be used to monitor (e.g., visually inspect) and maintain assets in an autonomous or semi-autonomous manner using robotic intermediaries such as unmanned drones or other robots. As discussed herein, the robotic intermediaries may be used to facilitate one or both of health monitoring of the asset and repair, remediation, or improvement of the asset with limited or no human support.

Over time, assets may deteriorate due to weather, physical wear, or the like. For example, over months or years, one or more components of an asset may wear or deteriorate due to rain and wind or other environmental conditions or due to inadequate maintenance. Alternatively, in some instances, spontaneous failures of one or more components or systems of an asset may occur which may be unrelated to wear or maintenance conditions but may instead be attributable to an undetected defect or an unknown stressor. Regardless of whether an asset defect is due to gradual process or a sudden occurrence, the health of the asset depends on identifying and addressing such defects in a timely and effective manner.

The example embodiments provide a robot system that may be used to monitor and manage the health of an asset that reduces or eliminates human intervention. A robot may be a machine (e.g., electro-mechanical) capable of carrying out a set of tasks (e.g., movement of all or part of the robot, operation of one or more type of sensors to acquire sensed data or measurements, and so forth) automatically (e.g., at least partially without input, oversight, or control by a user), such as a set of tasks programmed by a computer. For example, the robot may include one or more sensors to detect one or more characteristics of an asset and one or more effectors to perform an operation based on a 3D virtual inspection plan to assess, repair, and/or service the asset. The robot may include a processing system that includes one or more processors operatively coupled to memory and storage components. The robot may also include effectors capable of performing monitoring and maintenance of an asset under the control the processing system.

FIG. 1 illustrates a robotic inspection system 100 in accordance with an example embodiment. Referring to FIG. 1, the robotic inspection system 100 includes an unmanned robot 130 that inspects an asset 140. For example, the unmanned robot 130 may include an unmanned aerial vehicle (UAV) such as a drone, a crawling robot, a rolling robot, a walking robot, and/or the like. In the example of FIG. 1, the unmanned robot 130 includes a docking station 132 for recharging and storage. Also, the unmanned robot 130 may communicate with a controller 120 and/or a base station 110. For example, the controller 120 and the base station 110 may receive data from and transmit data to the unmanned robot 130 via a data communication channel. Also, in some examples the base station 110 may receive input from a user (e.g., an engineer) sending commands to the unmanned robot 110 via the data communication channel. The communication channel may be wireless, for example, satellite, cellular, local, and/or the like, and/or it may be wired in some instances.

The asset 140 may be a structure that is disposed at a geographical location accessible by the unmanned robot 130. For example, the asset 140 may be an oil platform disposed at sea, a tank or well that is disposed under the earth's surface, a pipeline disposed along the earth's surface, a bridge, a gas flare, a turbine, and/or the like. Based on an inspection plan, the unmanned robot 130 may autonomously move about and around the asset 140 while inspecting (e.g., collecting data) from the asset 140. In the example of FIG. 1, the unmanned robot 130 is a drone that can fly about the asset 140. The drone can land on locations on a surface of the asset 140, pause in mid-air, and the like. As described herein, the drone 130 may fly about a travel path around the asset 140 based on a 3D model of a virtual travel path included in a flight inspection plan. In some cases, the drone 130 may also receive instructions providing a travel path from the docking station 132 to a starting point of the flight inspection plan.

According to various embodiments, the unmanned robot 130 may perform an inspection of a plurality of regions of interest of the asset 140 based on a 3D virtual inspection plan that is received from the base station 110, the controller 120, or input locally through the unmanned robot 130. The regions of interest may be positioned at various distributed locations throughout the asset 140, clustered within a predefined area of the asset 140, and/or the like. Each region of interest may include a position such as a point of interest, an area of interest, etc., to be inspected on the asset, an angle at which the camera (or other sensor) should be positioned with respect to a surface of the asset at the region of interest, an angle of rotation about the asset that the drone should travel while capturing sensor data, and the like.

Figure 2:
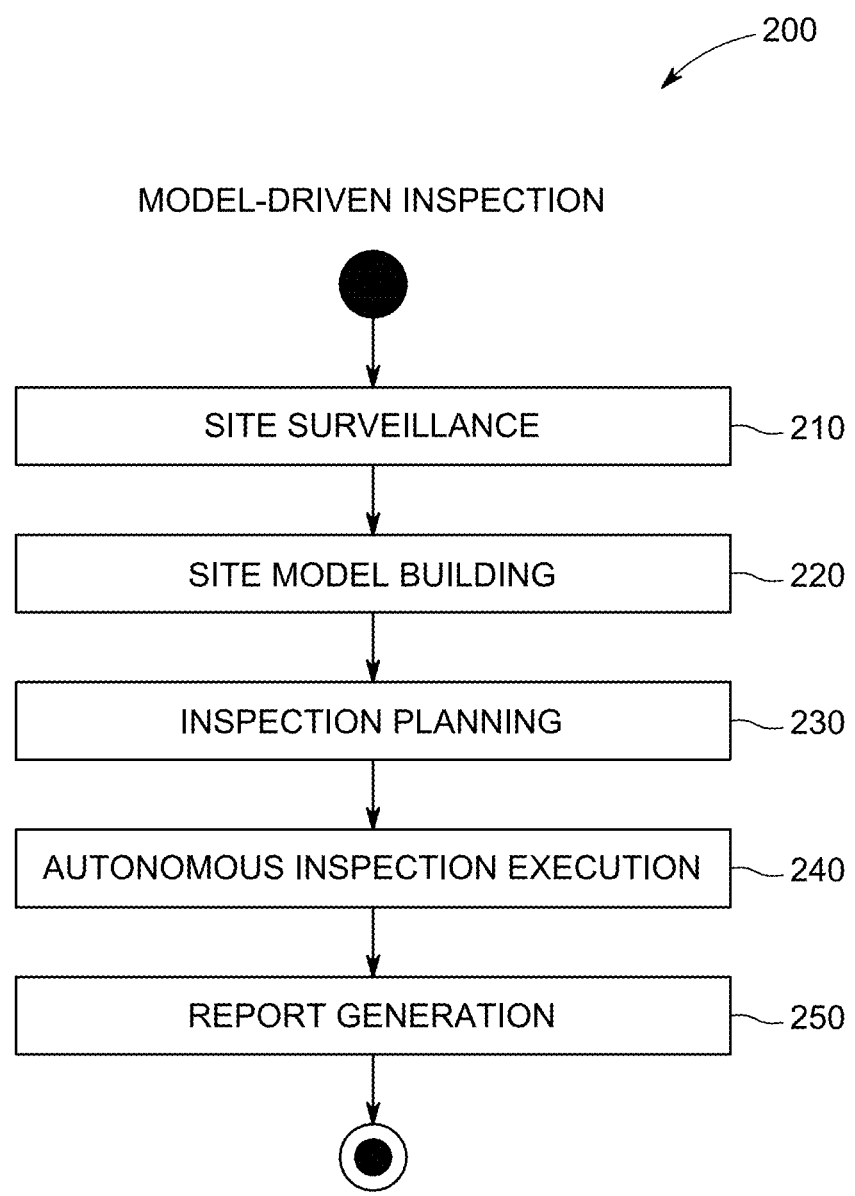
FIG. 2 is a diagram illustrating a model-driven asset inspection process in accordance with an example embodiment.

FIG. 2 illustrates an end-to-end robotic inspection process 200 that may be performed for monitoring the health of an asset in accordance with an example embodiment. The process 200 may be performed by the system shown in FIG. 1, or another device or plurality of devices. Referring to FIG. 2, in 210, site information and/or detailed asset 3D models may be collected from a site through a surveillance and planning stage and imported into the user interface. For example, the site information may be obtained by a robot that includes a depth sensor and cameras (e.g., RGB, infrared, etc.) mounted thereon (e.g., a UAV, drone, etc.) which can be a different robot than the inspection robot performing the inspection process or it may be the same robot. As another example, the site information may be gathered from historic data and/or models in virtual space.

In 220, an asset model is designed, for example, based on the surveilled information and/or historical information of the asset and its parts. The asset model may include a 3D virtual model that is a digital replica (i.e., digital twin) of a corresponding real (i.e., physical) asset. In some examples, the asset model may contain additional semantic information (also referred to as labels) identifying specific assembly components within the asset, history of maintenance and repair actions of each component, and other information that may be used to update, maintain, or generate new inspection plans for the asset or similar types of assets. Also, the asset model may include virtual representations of structures around the asset in physical space such as buildings, trees, hills, bodies of water, and the like. Aside from component labels, semantic information may also include features and characteristics such as anomalies (e.g., cracks, corrosion, etc.) that may have been identified during the initial process of building the 3D model or afterwards. Semantic information may be generated manually, but also via automated techniques such as software leveraging computer vision and machine learning techniques.

In order to generate the inspection plan, a user interface (e.g., application or other software) may be provided and may be interacted with via a user device such as the base station, a tablet, or other computer, allowing a user such as an inspector to identify regions of interest with respect to the virtual asset. For example, the user may specify one or more regions of interest on a virtual asset's 3D model to be inspected by an inspection robot. The user interface may automatically capture data about the user's selection through the user interface, for example, each point's location in virtual space with reference to a frame origin, viewing angle or field of view of the robot with respect to the virtual asset, a number of shots and sensor measurements that should be taken, a resolution at which images should be captured, a minimum resolvable feature from which to capture data, a view primitive (e.g., straight line, semi-circle, full circle, and the like) to be traversed at the point of interest, and the like. According to various embodiments, the user annotated model of the virtual asset may be used to auto-generate a highly accurate virtual 3D robot travel path (e.g., drone flight inspection plan) in 230. For example, the application described herein may generate a virtual 3D travel path about the asset in virtual space to be used by the robot during the inspection process.

Figure 4A:
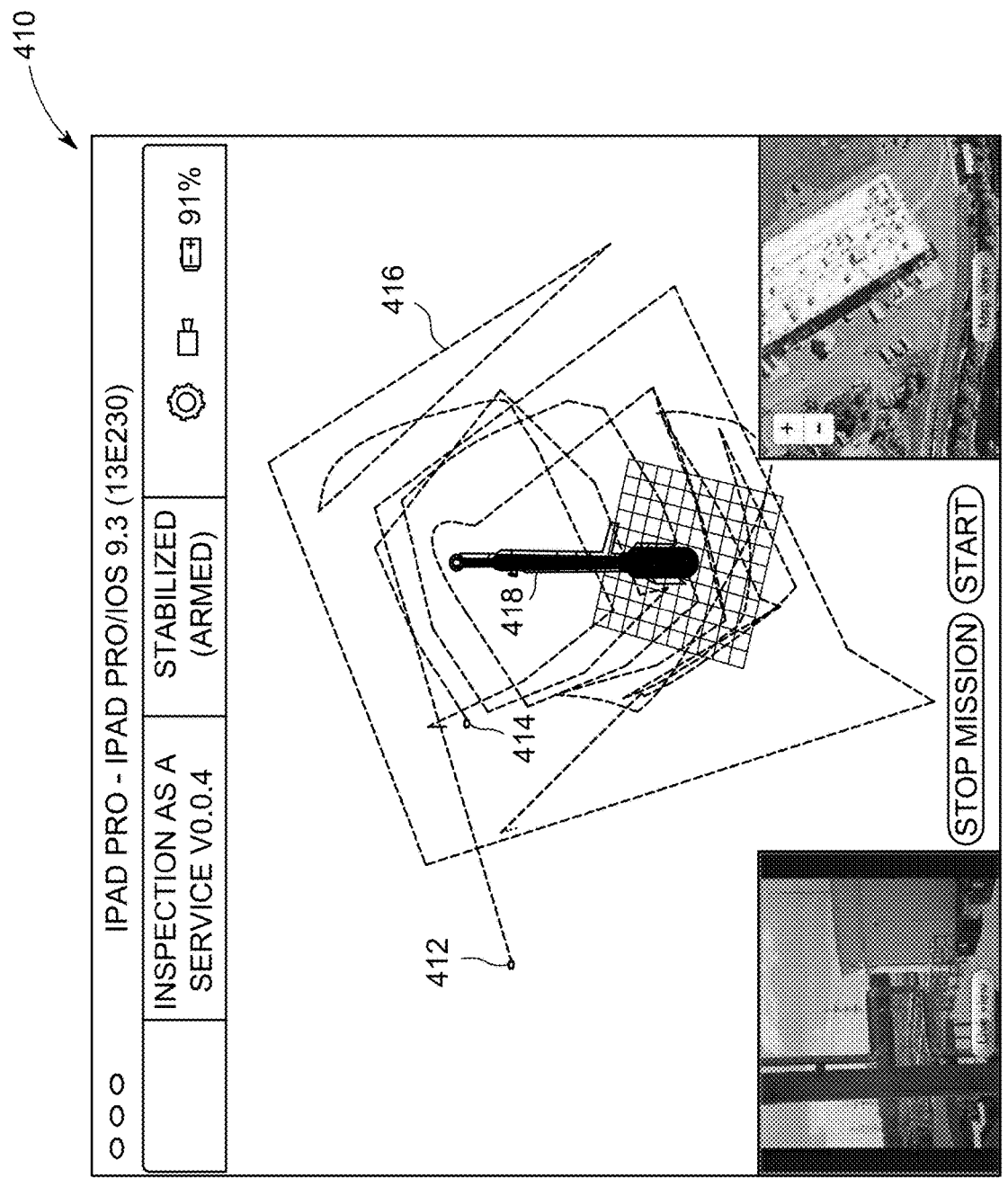
FIGS. 4A and 4B are diagrams illustrating virtual 3D robotic inspection paths generated with respect to a virtual asset in accordance with an example embodiment.

A non-limiting example of a virtual 3D travel path is shown in FIG. 4A via a screen shot of a user interface 410.

In this example, virtually created 3D travel path 416 is positioned about an asset 418 and includes a plurality of regions of interest as well as a virtual starting point 412 and a virtual end point 414 of the 3D travel path 416. When generated, the travel path 416 may include an order in which the ROIs are to be inspected by the robot. Each virtual 3D travel path (e.g., flight route) may correspond to a sequence of travel paths and way points in real space. For example, the sequence of travel paths (e.g., regions of interest on a flight path) may be connected by a continuous line 416 in virtual space between a virtually selected beginning point 412 and a virtually selected end point 414 of the virtual 3D travel path 416. The line of the 3D travel path 416 may move continuously while changing throughout in each of X, Y, and Z coordinate axes within virtual space thereby simulating continuous three dimensional movement of the robot that is highly accurate. In addition, the 3D travel path 416 may wrap around the asset 410 one or more times while at the same time changing in each of X, Y, and Z coordinate axes along a continuous line generated by the system described herein.

The 3D travel path 416 in virtual space may be aligned with a physical travel path in the physical space (e.g., real world), for example, by a flight planning application. Way points in real space correspond to regions of interests on the virtual space, and are points at which data and photos are to be captured by the robot. For example, in addition to video and still images, the data to be captured may include thermal images, ultraviolet images, sniffing for chemical concentrations, and the like, of various asset parts, asset sub-regions, and the like. The route planning can be done in multiple passes, for example, using RGB camera and IR camera separately. In addition, the inspection plan can be adjusted on the inspection site to focus on certain points of interest. For example, an IR camera pass may detect hot spots that are set for further inspection using the RGB camera.

In the example of FIG. 4A, the virtually created 3D travel path 416 may be dynamically generated based on a plurality of user inputs with respect to a virtual replica 418 of the physical asset which are received via the user interface. Here, the user interface 410 may display the virtual model corresponding to the physical asset and receive regions of interest as well as other information from the user via commands through the user interface 410. In order to generate a real travel path, the virtual 3D travel path 416 can be aligned or otherwise transformed from a virtual travel path into a real travel path. For example, the aligning of the dynamically created virtual 3D travel path 416 may include converting X, Y, and Z coordinates of the virtual travel path in the virtual space into latitude, longitude, and height components of the real travel path in the real world.

Figure 4B:
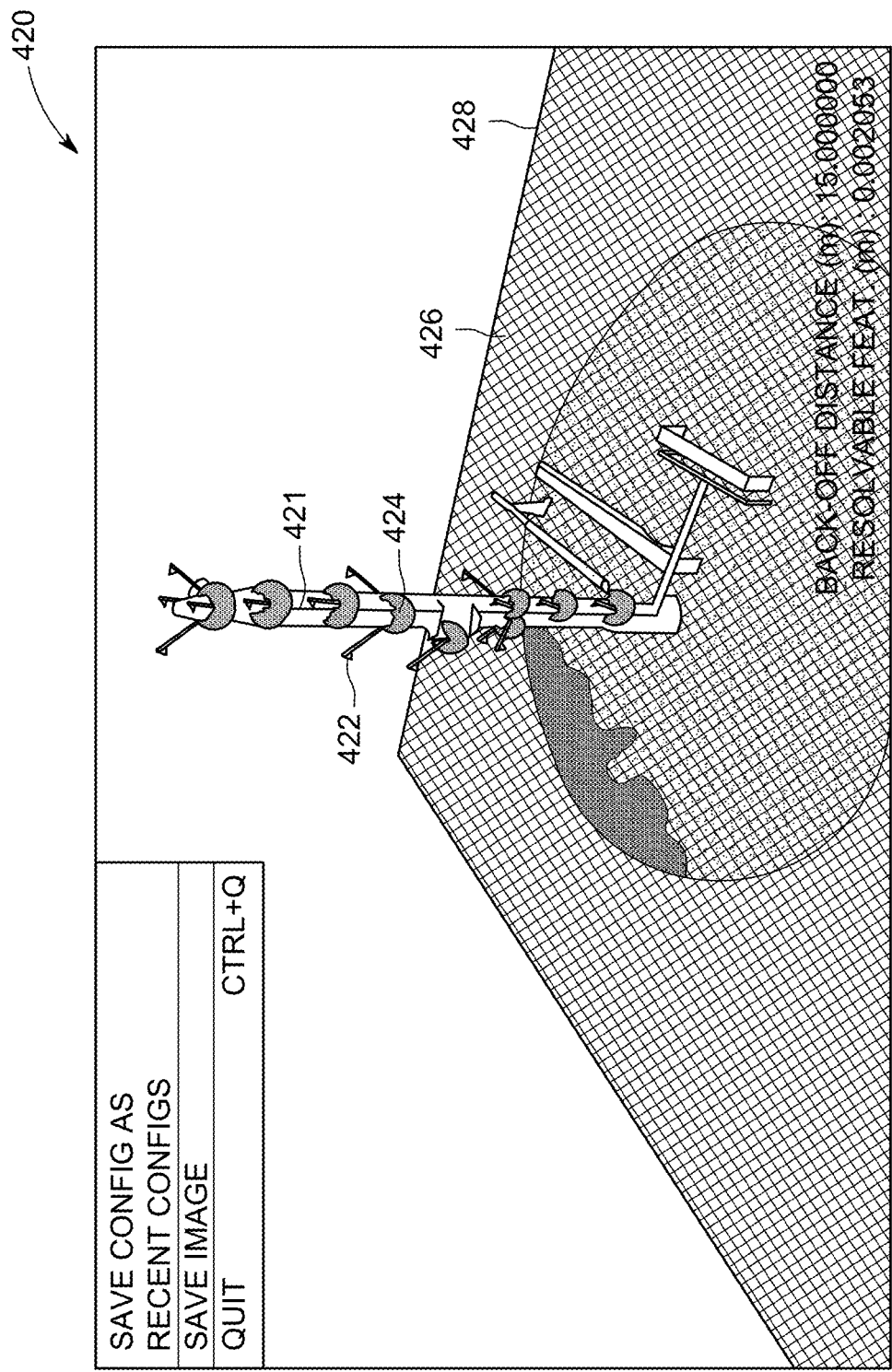

FIG. 4B illustrates another screen shot of the user interface 420 which includes a virtual representation of an asset 421 in virtual space. In addition, the example of FIG. 4B illustrates a coordinate frame 426 having a point of origin 428 which may be represented by 0, 0, 0, in the X, Y, and Z Cartesian coordinates in virtual space. In this example, a plurality of regions of interest 422 are selected and include a view primate 424 which represent an amount of rotation about the asset to be performed by the unmanned robot in virtual space. In addition to the view primitives 424, the system may automatically detect camera angles or field of view for viewing the asset based on a rotation of the virtual asset within the user interface such as user interface 410 and 420. As another example, the user interface may receive input indicating a number of images to capture, as well as a back-off distance for the unmanned robot to be from the asset when capturing the images. The back-off distance may be based on a minimum resolvable feature desired by the user, and the back-off distance may be determined by the system. For example, the back-off distance may be a function of camera viewing angle, resolution, lens, etc. The various information may be added via the virtual space and incorporated into the travel inspection plan created for the unmanned robot.

According to various embodiments, the user interface described herein enables a 3D model of a flight path or travel path to be generated dynamically by a user via user inputs that are received through a user interface. In other words, the travel path can be created virtually. The inputs may be received with respect to a digital replica of the real asset. As a result, an initial flyby of the real asset is not required for determining a flight path of the unmanned robot. Rather, a user can virtually design a 3D virtual flight path virtual in 3D space that can perform a very accurate 3D inspection (e.g., within several centimeters of error) based on the virtually created 3D travel path without requiring an initial inspection of the asset thereby conserving energy consumption and time. Furthermore, the virtual 3D path can be created dynamically. For example, the user or an application or other program may select or otherwise input a dynamic virtual start point including a first vertical location and a first lateral location, and input a dynamically selected virtual end point including a second vertical location and a second lateral location which differ from the first vertical location and the first lateral location, respectively.

Referring again to FIG. 2, in 240, an autonomous or semi-autonomous inspection of the asset is performed by the unmanned robot (e.g., UAV, drone, crawler, roller, walker, etc.) based on the virtually created 3D travel path. In the example of a UAV, high-accuracy GPS/DGPS systems and autopilot controllers allow the UAV to execute a complex and precise flight plan around assets based on the virtual 3D travel path included in the flight plan. The UAV may follow a predefined GPS/DGPS guided route based on the site information, detailed asset 3D model and points of interests. The route guidance may be achieved by an embedded computing unit on the drone that controls the drone flight and/or highly accurate GPS/DGPS antennas that can pinpoint the drone location within centimeters of accuracy. Also, other information instead of GPS/DGPS may be used for localization of the robot such as known localization techniques in GPS/DGPS denied areas.

In addition, cameras and other sensors attached to the drone may also be controlled by the same embedded computing unit and synced with flight route to capture data exactly at point of interests (specified by experts during planning stage). In 250, a report may be generated by the robot or by the base station based on the data captured by the robot. The report may include identification of areas on the asset that need repair, replacement, maintenance, and the like, as well as health and status details about the asset based on the captured data. For example, one or more predictive analytics may be performed based on the captured data and added to the report.

In some examples, inspectors may supervise the overall operation of the unmanned robot performing the process inspection process 240 via a mobile application that monitors each part of the inspection process including sensor data and pictures, drone location, position with respect to the asset, and the like. In some cases, image quality analysis algorithms may automatically flag potential low quality pictures (e.g., unclear photos, point of interest too small or not within center of the frame, etc.), assisting the user to detect bad photos during the flight. Reduced quality copies of pictures taken by the drone may be sent to the mobile application where a user can then quickly verify the quality and accuracy of each picture. Images may also be geotagged and associated to their correspondent position in the flight plan and asset model. In addition, the robot can be instructed to re-run certain travel/flight paths and re-take a subset of the points of interest, during flight, if necessary, correcting potential errors on the spot. The resulting system allows for a fully autonomous inspection or a single-user inspection with semi-autonomous inspection (as opposed to multi-user inspection which has been traditionally required). The embodiments also provide the robot with control to start, stop, pause, and resume the movement/flight due to model-driven auto pilot.

The system provided herein also supports multiple-drone operation in multi configurations, optimizing inspection procedure. In a serial drone deployment, one drone may be deployed at a time, minimizing battery exchange down time. In a serial drone operation for multi-pass inspection, a first drone may perform a scan pass using an infra-red camera, following a model path, detecting hot spots and leaks and a second drone may perform a high-resolution image capture of hot spots detected by first drone. As another example, in parallel deployment, multiple drones may be deployed at a time, on a divide and conquer strategy, having each drone inspect a sub-area of the asset in parallel. In this example, route planning of multiple drones may be performed to avoid mid-air collision and distribute the points of interest to balance the load of each drone.

According to various aspects, the process 200 may reduce inspection time of a robot and cost due to improved data quality and accuracy (reduced inspection errors), reduced crew operations (e.g., one user instead of two or more), reduced flight time (optimal route planning, reduce time to take the same points of interest multiple time, less down time to change battery, detection of photo quality during the flight, etc.), and improved safety to the overall inspection process. The process 200 enables detection by targeting points/regions of interest from a same location, angle, and back-off distance inspection after inspection.

Figure 3:
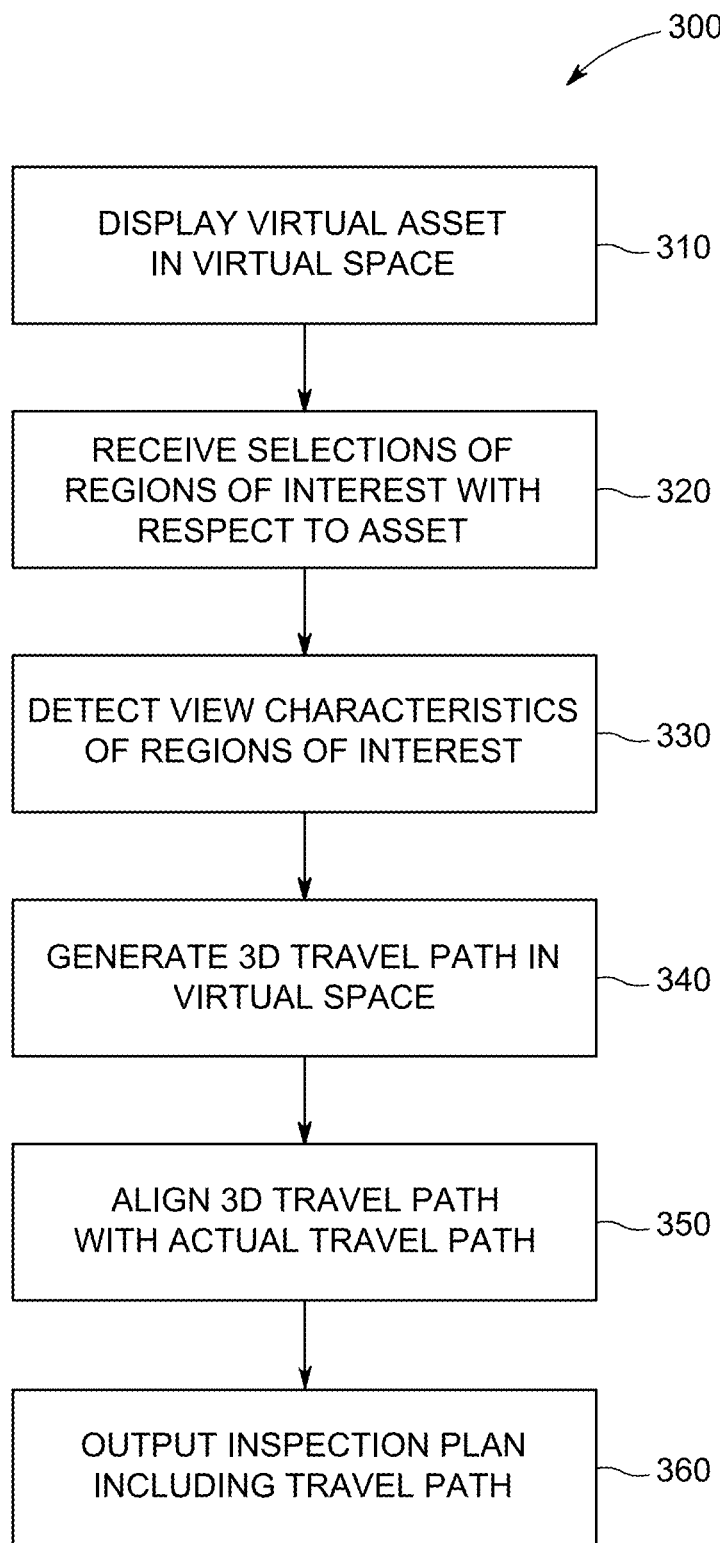
FIG. 3 is a diagram illustrating a process of receiving user selections and building a 3D robotic inspection plan in accordance with an example embodiment.

FIG. 3 illustrates a process 300 of receiving user selections via a user interface and building a 3D robotic inspection plan in accordance with an example embodiment. For example, the process 300 may be performed by a software application executing on a computing device such as the base station 110 in FIG. 1, or another computing device. Referring to FIG. 3, in 310, the user interface display a 3D model of an asset and in some cases may display virtual details representing obstacles around the asset in physical space. For example, the 3D model may be imported into the system (user interface) and the user can view the model in 3D via the user interface and interact with the model, for example, by rescaling, rotating, etc. using drag-and-drop commands or the like.

In 320, the user may select points of interest of the virtual asset, for example, by clicking on the points of interest on the model. In some cases, when the user clicks on a point of interest, the user has a viewing angle in 3D space via the user interface. As another example, regions of interest may be entered into the system using a spreadsheet upload or table, chart, etc., instead of having a user click on points. As another example, regions of interest may be determined by the system based upon analysis of previous inspections performed and/or the results obtained. Also, regions of interest may be determined based on a combination of these factors.

The viewing angle may be generated based on the user manipulating the virtual model of the asset in 3D space. According to various aspects, in 330, the system or the application can remember the view angle at which the user is viewing the virtual asset in the virtual world (i.e., perspective) and store the viewing angle with respect to a coordinate frame of the virtual space. For example, the system can store the point on the asset and the vector from the asset to where the viewer is looking at the asset in 3D virtual space. In addition, a user can input what sort of "view primitive" the user desires to use (e.g., half circle, full circle, pie, line, etc.) Additional characteristics can also be detected by the system such as resolution, number of images to capture, and the like. The virtual space that has a coordinate frame (where zero, zero, zero, may be defined as the frame origin). Each point on the model has an X, Y, and Z value in the coordinate frame with respect to the frame origin (0, 0, 0).

For each point of interest selected by the user via the user interface, the system may store the following information, (a) a location/position of the point with respect to the coordinate frame origin, (b) a vector that represents the view angle at which the user was looking at the point when it was selected asset, (c) a desired resolution (pixels/inch) and/or a minimum resolvable feature (e.g., a crack of a certain size or corrosion patch of a certain size, etc.), (d) a semantic label that a user can fill out that is a text description of what they are looking at such as part name or area of the asset, (e) a view primitive (semi-circle, line, etc.), and (f) a unique ID that may be arbitrary. The data may be stored in a file such as an XML file, or the like, and input into a planning application for generating a flight inspection plan for the unmanned robot in physical space.

In 340, the system may generate a virtual 3D travel path in the virtual space based on the position/location of the regions of interest as well as various criteria such as shortest path, least amount of energy consumed, and the like. In some cases, the least amount of energy consumed may include the least amount of rises required by the unmanned robot because going against the force of gravity can consume the most power. For example, information form the XML, file may be loaded into a planning application which generates a travel path (e.g., flight path) based on the user inputs. The planner determines how far away from the asset the robot needs to be to capture data based on the desired resolution to capture the image/feature with whatever sensor it is using with respect to the frame origin. The planner may also determine a shortest path needed to string together all of the points of interest and generates a travel path based thereon.

During planning, in 350, alignment with the real world also occurs. For example, the system may know where the physical asset is located base on GPS/DGPS coordinates and also know where the drone takes off from in GPS/DGPS coordinates. Here, the difference in GPS/DGPS coordinates may be used to calculate where the drone is relative to the asset. The 3D coordinates may be converted into a Cartesian coordinate frame about where the drone is located. Therefore, the origin may become where the drone takes off from. Accordingly, an actual travel path in physical space can be created based on the virtual 3D travel path that has been aligned with the real world. The actual travel path is output in 360, for example, to the unmanned robot, a display, a controller, and the like.

Figure 5:
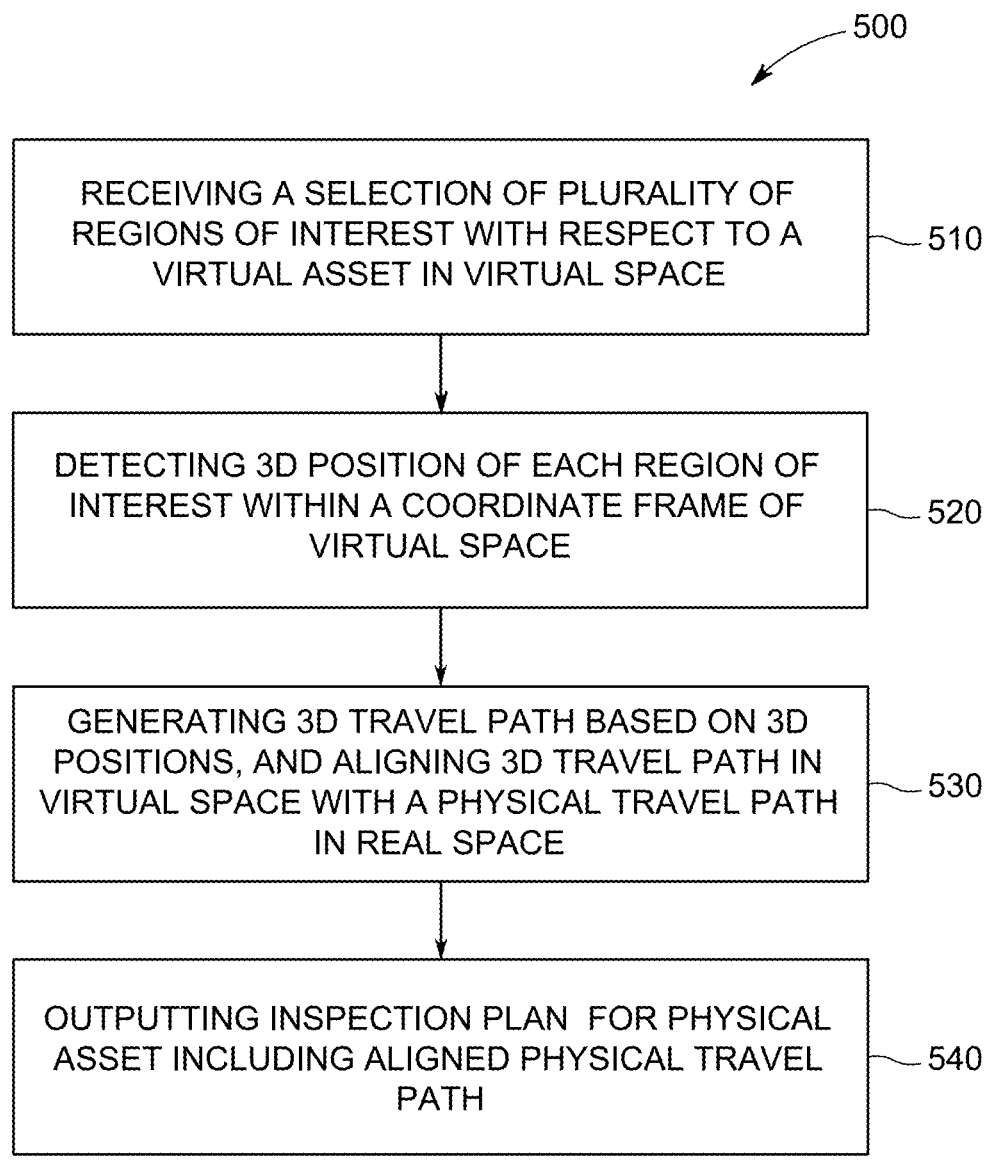
FIG. 5 is a diagram illustrating a method for generating a 3D robotic inspection plan in accordance with an example embodiment.

FIG. 5 illustrates a method 500 for generating a virtual inspection plan that is to be performed by an unmanned robot. For example, the method 500 may be performed by software (e.g., application, web service, program, code, etc.) executing on a user device such as a laptop, tablet, desktop, mobile phone, appliance, kiosk, and the like. Referring to FIG. 5, in 510 the method includes receiving, via a user interface, a selection of a plurality of regions of interest with respect to a virtual asset displayed in virtual space. For example, the user interface may receive selections from a user in virtual space with respect to a virtual model of a physical asset to be inspected. In addition, the system may also receive or automatically detect additional features about the regions of interest including, for example, a viewing angle or field of view at which the user interface is viewing a surface of the virtual asset based on orientation of the virtual model within the user interface, a desired resolution for capturing images, one or more view primitives, a distance between the robot and the surface of the virtual asset, and the like.

In 520, the method includes detecting a three-dimensional position of each selected region of interest within a coordinate frame of the virtual space. For example, each 3D position may include virtual distances along three axes (e.g., X, Y, and Z) in virtual space with respect to a virtual point of origin on the coordinate axes (e.g., 0, 0, 0). Based on the 3D positions, in 530 the method includes generating a travel path for the unmanned robot about a physical asset corresponding to the virtual asset. For example, the generating may include generating a virtual 3D travel path with respect to the virtual asset based on the detected 3D positions of the selected regions of interest within the coordinate frame and aligning the virtual 3D travel path in the virtual space with a physical travel path in a physical space.

For example, the virtual 3D model of the travel path may be automatically generated by the application and may include a line or other marking that continuously moves throughout Cartesian coordinates (X, Y, and Z axes) in virtual space with respect to a virtual representation of the asset. The virtual 3D model may be generated dynamically based on user inputs received via the user interface that also displays the virtual asset. The 3D travel path may be generated to satisfy one or more predefined criteria such as shortest path or least energy consumed, etc. The 3D travel path may provide lateral and vertical movement positions of the unmanned robot in a simulated virtual environment over time from a beginning point to an ending point. For example, the 3D model of the travel path may include a dynamically selected virtual start point including a first vertical location (i.e., height) and a first lateral location (i.e., latitude and longitude), and a dynamically selected virtual end point that includes a second vertical location and a second lateral location which differ from the first vertical location and the first lateral location, respectively. In addition, the 3D model may include a continuous path between the virtual start point and the virtual end point that moves around the virtual asset.

In some embodiments, the detecting in 520 may further include detecting a virtual viewing angle at which the user interface is viewing a respective region of interest on the virtual asset in the virtual space based on a rotation of the virtual asset via the user interface, and the generating in 530 may further include converting the virtual viewing angle for the respective region of interest in the virtual space into a physical viewing angle in the robotic inspection plan to be performed by the unmanned robot in physical space. Here, the detecting of the virtual viewing angle may include determining a vector in virtual space that represents the virtual viewing angle at which the user interface is viewing a surface of the virtual asset. In addition, the aligning in 530 may include aligning the coordinate frame of the virtual space with a position associated with the physical asset in physical space based on GPS/DGPS coordinates of the unmanned robot in physical space and the location of the physical asset with reference to GPS/DGPS coordinates based on historical data that is included in the virtual inspection plan.

In some embodiments, the detecting in 520 may include receiving a selection of a view primitive for a region of interest on the virtual asset in the virtual space via the user interface, and the generating in 530 may further include converting the selected view primitive for the respective region of interest in the virtual space into the robotic inspection plan to be performed by the unmanned robot in physical space. As another example, in some cases the method may further include receiving a selection of a desired resolution for a region of interest of the virtual asset in virtual space via the user interface, and the generating may include generating a distance a distance between the physical travel path and the physical asset (e.g., 5 meters, 10 meters, 15 meters, etc.) in the physical inspection plan and an angle at which a camera or other sensor should capture data (e.g., 30 degrees with respect to a surface of the asset, 30 degrees with respect to ground, etc.)

Figure 6:
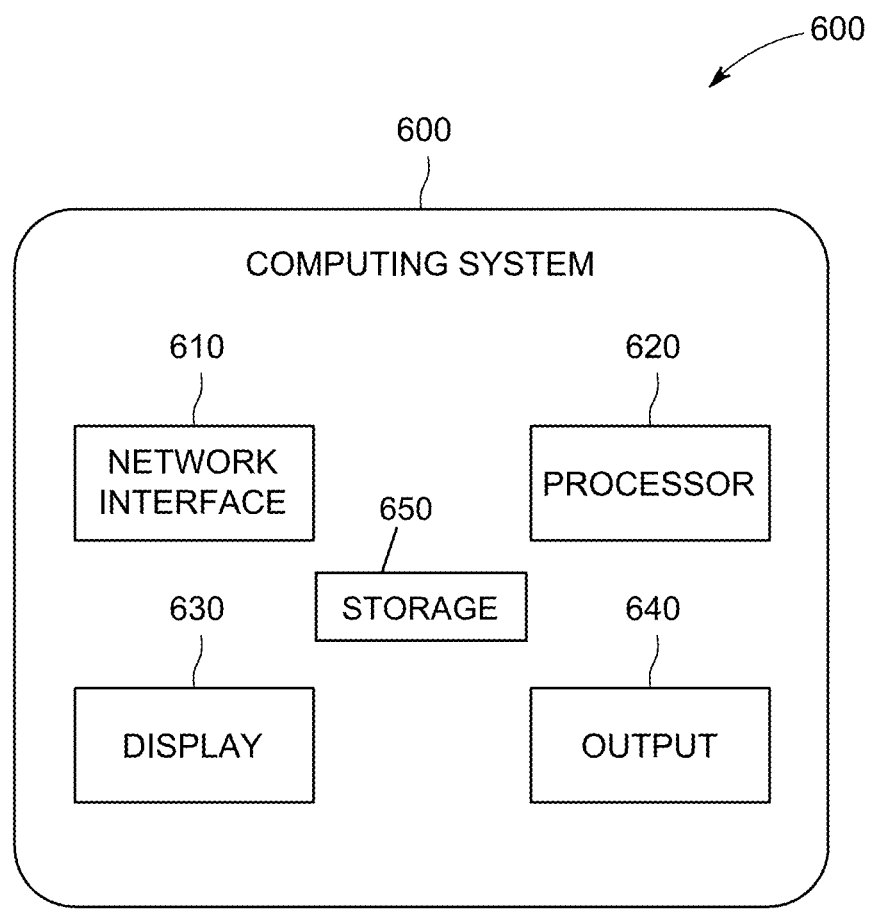
FIG. 6 is a diagram illustrating a robotic inspection computing system in accordance with an example embodiment.

FIG. 6 is a diagram illustrating a computing system 600 for generating a 3D robotic inspection plan in accordance with an example embodiment. For example, the computing system 600 may be a device or group of devices that communicate with a robot and control the robot via a wired or wireless connection. Referring to FIG. 6, the computing system 600 includes a network interface 610, a processor 620, a display 630, an output 640, and a storage 650. Although not shown in FIG. 6, the robotic system 600 may include other components such as an input unit, one or more storage devices, etc. The network interface 610 may be a data communication interface that transmits and receives data over a network such as the Internet, a private network, a public network, and the like, via a satellite network, a cellular network, a local network, and/or the like. The processor 620 may include one or more processing devices each including one or more processing cores. In some examples, the processor 620 is a multicore processor or a plurality of multicore processors. Also, the processor 620 may be fixed or it may be reconfigurable. The display 630 may display a user interface and other data via an embedded display of the system 600 or another device externally connected to the system 600, and the like. The output 640 may output the user interface and other data to the display 630.

According to various embodiments, the processor 620 may execute an inspection planning application that includes a user interface configured to display a virtual representation of an asset that is to be inspected by an unmanned robot. The user interface may receive and the processor 620 may detect selections of a plurality of regions of interest with respect to a virtual asset displayed in virtual space and store a three-dimensional (3D) position of each selected region of interest within a coordinate frame of the virtual space in a storage that is associated with the system 600. The storage 650 may store the regions of interest with respect to a virtual asset displayed in virtual space, and store a three-dimensional (3D) position of each region of interest within a coordinate frame of the virtual space.

According to various embodiments, the processor 620 may generate a travel path for the unmanned robot about a physical asset corresponding to the virtual asset. For example, the processor 620 may generate a virtual 3D travel path with respect to the virtual asset based on the detected 3D positions of the selected points/regions of interest within the coordinate frame and align the virtual 3D travel path in the virtual space with a physical travel path in a physical space. For example, the processor 620 may align the coordinate frame of the virtual space with a position associated with the physical asset in physical space based on GPS/DGPS coordinates of the asset in real space and historical information stored within the inspection plan. The output 640 may output a robotic inspection plan comprising the generated physical travel path about the physical asset for the unmanned robot to a display or another device or system such as the unmanned robot itself and/or a control device.

In some embodiments, the processor 620 may detect a virtual viewing angle at which the user interface is viewing a respective region of interest on the virtual asset in the virtual space based on a rotation of the virtual asset via the user interface, and the processor 620 may convert the virtual viewing angle for the respective region of interest in the virtual space into a physical viewing angle in the robotic inspection plan to be performed by the unmanned robot in physical space. For example, the processor 620 may detect a vector in virtual space that represents the virtual viewing angle at which the user interface is viewing a surface of the virtual asset.

In some embodiments, the processor 620 may receive a selection of a view primitive for a region of interest on the virtual asset in the virtual space via the user interface, and convert the selected view primitive for the respective region of interest in the virtual space into the robotic inspection plan to be performed by the unmanned robot in physical space. As another example, the processor 620 may receive a selection of a desired resolution or minimum resolvable feature for a region of interest of the virtual asset in virtual space via the user interface, and generate a distance between the physical travel path and the physical asset in physical space and add the distance to the inspection plan to be performed by the unmanned robot.

Although the examples herein are provided, for the most part, with respect to assets on land it should be appreciated that the embodiments may be incorporated with submersible drones for inspecting underwater assets. In this situation, the virtual created 3D travel path would be created in the same way but instead of a travel path being through the air it would be through water or some other liquid based environment such as oil, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system, comprising:
   a storage configured to store a plurality of regions of interest selected on a surface of a digital representation displayed in a virtual space, wherein the digital representation corresponds to a physical asset in a physical space, and to store a three-dimensional (3D) position of each of the plurality of regions of interest within a coordinate frame of the virtual space;
   a processor configured to:
      generate a virtual 3D travel path about the digital representation based on the 3D position of each of the plurality of regions of interest within the coordinate frame of the virtual space;
      receive, via a user interface, a desired resolution of data to be acquired at a particular region of interest of the plurality of regions of interest;
      align the virtual 3D travel path in the virtual space with the physical asset in the physical space to generate a physical travel path in the physical space;
      determine, for a location on the physical asset corresponding to the particular region of interest, a distance at which an unmanned robot is to be positioned from the location to acquire the data at the desired resolution; and
      incorporate the distance in the physical travel path to be executed by the unmanned robot; and
   an output configured to output a robotic inspection plan for the unmanned robot comprising the physical travel path about the physical asset.

2. The computing system of claim 1, wherein the processor is configured to detect a virtual viewing angle from which the user interface is displaying a respective region of interest of the plurality of regions of interest.

3. The computing system of claim 2, wherein the processor is configured to determine a viewing vector that represents the virtual viewing angle from which the user interface is displaying the respective region of interest on the digital representation in the virtual space.

4. The computing system of claim 3, wherein the processor is configured to convert respective viewing vectors associated with the plurality of regions of interest into corresponding physical viewing angles at which the unmanned robot is to be oriented relative to the physical asset along the physical travel path in the physical space.

5. The computing system of claim 1, wherein the processor is configured to align the coordinate frame of the virtual space with a position associated with the physical asset in the physical space based on Global Positioning System (GPS) coordinates.

6. The computing system of claim 1, wherein the processor is further configured to:
   receive, from the user interface, a selection of a view primitive for a respective region of interest of the plurality of regions of interest on the digital representation; and
   associate the view primitive with an amount of rotation that the unmanned robot is to travel about the physical asset in the physical space.

7. The computing system of claim 1, wherein the virtual 3D travel path comprises a dynamically selected virtual start point comprising a first vertical location and a first lateral location in the virtual space, and a dynamically selected virtual end point comprising a second vertical location and a second lateral location in the virtual space which differs from the first vertical location and the first lateral location, respectively.

8. The computing system of claim 1, wherein the virtual 3D travel path comprises a virtual line between at least two of the plurality of regions of interest, wherein lateral and vertical positions of the virtual 3D travel path simultaneously and continuously change along the virtual line between the at least two of the plurality of regions of interest.

9. The computing system of claim 1, wherein the virtual 3D travel path is generated by the processor based on identification of a shortest path that extends through each 3D position of the plurality of regions of interest in the virtual space.

10. A method for generating a robotic inspection plan that is to be performed by an unmanned robot, the method comprising:
   receiving, via a user interface, a selection of a plurality of regions of interest on a surface of a digital representation of a physical asset in a physical space, wherein the digital representation is displayed in a virtual space;
   detecting a three-dimensional (3D) position of each of the plurality of regions of interest within a coordinate frame of the virtual space;
   generating a virtual 3D travel path about the digital representation based on the 3D position of each of the plurality of regions of interest within the coordinate frame of the virtual space;
   receiving, via the user interface, a desired resolution of data to be acquired at a particular region of interest of the plurality of regions of interest;
   aligning the virtual 3D travel path in the virtual space with the physical asset in the physical space to generate a physical travel path in the physical space;
   determining, for a location on the physical asset corresponding to the particular region of interest, a distance at which the unmanned robot is to be positioned from the location to acquire the data at the desired resolution;
   incorporating the distance in the physical travel path to be executed by the unmanned robot; and
   outputting the robotic inspection plan for the unmanned robot comprising the physical travel path about the physical asset.

11. The method of claim 10, comprising detecting a virtual viewing angle from which the user interface is displaying a respective region of interest of the plurality of regions of interest.

12. The method of claim 11, comprising determining a viewing vector that represents the virtual viewing angle from which the user interface is displaying the respective region of interest on the digital representation in the virtual space.

13. The method of claim 12, comprising converting respective viewing vectors associated with the plurality of regions of interest into corresponding physical viewing angles at which the unmanned robot is to be oriented relative to the physical asset along the physical travel path in the physical space.

14. The method of claim 10, wherein aligning the virtual 3D travel path comprises aligning the coordinate frame of the virtual space with a position associated with the physical asset in the physical space based on Global Positioning System (GPS) coordinates.

15. The method of claim 10, further comprising:
receiving, from the user interface, a selection of a view primitive for a respective region of interest of the plurality of regions of interest on the digital representation; and
associating the view primitive with an amount of rotation that the unmanned robot is to travel about the physical asset in the physical space.

16. The method of claim 10, wherein the virtual 3D travel path comprises a dynamically selected virtual start point comprising a first vertical location and a first lateral location in the virtual space, and a dynamically selected virtual end point comprising a second vertical location and a second lateral location in the virtual space which differs from the first vertical location and the first lateral location, respectively.

17. The method of claim 10, wherein the virtual 3D travel path comprises a virtual line between at least two of the plurality of regions of interest, wherein lateral and vertical positions of the virtual 3D travel path simultaneously and continuously change along the virtual line between the at least two of the plurality of regions of interest.

18. The method of claim 10, wherein the virtual 3D travel path is generated based on identification of a shortest path that extends through each 3D position of the plurality of regions of interest in the virtual space.

19. A non-transitory computer readable medium having stored therein instructions that, when executed by a processor, cause the processor to perform a method for generating a robotic inspection plan that is to be performed by an unmanned robot, the method comprising:
receiving, via a user interface, a selection of a plurality of regions of interest on a surface of a digital representation of a physical asset in a physical space, wherein the digital representation is displayed in a virtual space;
detecting a three-dimensional (3D) position of each of the plurality of regions of interest within a coordinate frame of the virtual space;
generating a virtual 3D travel path about the digital representation based on the 3D position of each of the plurality of regions of interest within the coordinate frame of the virtual space;
receiving, via the user interface, a desired resolution of data to be acquired at a particular region of interest of the plurality of regions of interest;
aligning the virtual 3D travel path in the virtual space with the physical asset in the physical space to generate a physical travel path in the physical space;
determining, for a location on the physical asset corresponding to the particular region of interest, a distance at which the unmanned robot is to be positioned from the location to acquire the data at the desired resolution;
incorporating the distance in the physical travel path to be executed by the unmanned robot; and
outputting the robotic inspection plan for the unmanned robot comprising the physical travel path about the physical asset.

20. The non-transitory computer readable medium of claim 19, wherein the instructions, when executed by the processor, cause the processor to perform the method comprising:
detecting a virtual viewing angle from which the user interface is displaying a respective region of interest of the plurality of regions of interest;
determining a viewing vector that represents the virtual viewing angle from which the user interface is displaying the respective region of interest on the digital representation in the virtual space; and
converting respective viewing vectors associated with the plurality of regions of interest into corresponding physical viewing angles at which the unmanned robot is to be oriented relative to the physical asset along the physical travel path in the physical space.

* * * * *